United States Patent
Albarado

(10) Patent No.: US 7,091,848 B2
(45) Date of Patent: *Aug. 15, 2006

(54) ENCLOSURE SYSTEM FOR HOT WORK WITHIN THE VICINITY OF FLAMMABLE OR COMBUSTIBLE MATERIAL

(75) Inventor: Jason P. Albarado, Houma, LA (US)

(73) Assignee: Alford Safety Services, Inc., Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/011,848

(22) Filed: Dec. 14, 2004

(65) Prior Publication Data

US 2005/0151661 A1    Jul. 14, 2005

Related U.S. Application Data

(63) Continuation-in-part of application No. 10/388,271, filed on Mar. 13, 2003, now abandoned.

(51) Int. Cl.
*G08B 29/00* (2006.01)

(52) U.S. Cl. ............... 340/506; 340/3.1; 340/626; 340/632; 340/679; 340/691.6; 700/1

(58) Field of Classification Search ............ None
See application file for complete search history.

(56) References Cited

U.S. PATENT DOCUMENTS

| | | | | |
|---|---|---|---|---|
| 3,626,836 A | * | 12/1971 | Schneidler | 454/339 |
| 4,297,940 A | * | 11/1981 | Hainline | 454/49 |
| 4,298,955 A | * | 11/1981 | Munday et al. | 700/266 |
| 4,721,947 A | * | 1/1988 | Brown | 340/540 |
| 4,767,913 A | * | 8/1988 | Weber et al. | 219/130.21 |
| 4,866,594 A | * | 9/1989 | David et al. | 700/9 |
| 5,018,321 A | | 5/1991 | Wardlaw, III | |
| 5,101,604 A | * | 4/1992 | Wardlaw, III | 52/2.17 |
| 5,565,852 A | | 10/1996 | Peltier et al. | |
| 5,755,884 A | | 5/1998 | Buckler et al. | |
| 6,060,689 A | * | 5/2000 | Wilson | 219/137.41 |
| 6,130,412 A | * | 10/2000 | Sizemore | 219/481 |
| 6,182,497 B1 | * | 2/2001 | Krajci | 73/23.2 |
| 6,540,603 B1 | * | 4/2003 | Koskinen | 454/58 |
| 6,583,386 B1 | * | 6/2003 | Ivkovich | 219/130.01 |
| 6,783,054 B1 | * | 8/2004 | Pregeant et al. | 228/102 |
| 2004/0122353 A1 | | 6/2004 | Shahmirian et al. | |

(Continued)

FOREIGN PATENT DOCUMENTS

| | | |
|---|---|---|
| GB | 2311847 A | 8/1997 |
| GB | 2382593 A | 4/2003 |

(Continued)

OTHER PUBLICATIONS

Welding Hot Work Habitats SPE Health, Safety and Environment in Oil and Gas Exploration and Production Conference, Jan. 25-27, Jakarta, Indonesia; Author: Browning, I.G.

* cited by examiner

*Primary Examiner*—Benjamin C. Lee
*Assistant Examiner*—Son Tang
(74) *Attorney, Agent, or Firm*—Henry E. Naylor; Kean, Miller, Hawthorne, D'Armond, McCowan & Jarman, LLP

(57) ABSTRACT

One or more enclosures constructed about one or more objects at which hot work is to be performed at a facility containing flammable and/or combustible material. Hot work includes such things as welding, torch cutting, grinding and the like that produces heat, spark, slag or flame. The one or more enclosures are capable of being simultaneously and independently controlled and monitored by a single control and monitoring system.

44 Claims, 2 Drawing Sheets

US 7,091,848 B2

ENCLOSURE SYSTEM FOR HOT WORK WITHIN THE VICINITY OF FLAMMABLE OR COMBUSTIBLE MATERIAL

CROSS-REFERENCE TO RELATED APPLICATIONS

This application is a continuation-in-part of U.S. Ser. No. 10/388,271 filed Mar. 13, 2003 now abandoned.

FIELD OF THE INVENTION

The present invention relates to one or more enclosures constructed around one or more objects at which hot work is to be performed at a facility containing flammable and/or combustible material. Hot work includes such things as welding, torch cutting, grinding and the like that produces heat, spark, slag or flame. The one or more enclosures are capable of being simultaneously and independently controlled and monitored by a single monitoring and control system.

BACKGROUND OF THE INVENTION

Hot work, such as welding, at facilities where flammable and combustible materials are present is extremely dangerous and is regulated by the appropriate governmental agency depending on the facility. In the case of offshore platforms, hot work is regulated by the Mineral Management Service (MMS); in the case of a pipeline, pumping stations and associated facilities, hot work is regulated by the Department of Transportation (DOT); and in the case of refineries and chemical plants, hot work is regulated by the Occupational Safety and Health Administration (OSHA). Regulations stipulate that hot work cannot be preformed in or on any of said facilities within 35 feet from the point of impact where slag, sparks or other burning substances can fall onto or in the vicinity of a storage area of a container holding flammable or combustible materials. Also, hot work cannot be preformed within 10 feet of a pressurized pipe or vessel containing flammable or combustible material in or on any of said facilities.

In some cases, the hot work operation can be setup in a safe area and items to be hot worked can be brought to this safe area, hot worked, then returned to their original location. In most cases it is not practical, from a strategic or from an economic point of view, to setup a remote hot work location a distance away from the object to be hot worked. In the past, a facility such as a petroleum production platform, would have to be shut down during hot work operation. Further, a section of pipe or vessel in a petroleum refinery or chemical plant would have to be purged and cleaned of flammable and combustible material before any hot work could be performed within 10 feet of it. This created a substantial financial burden for the operator of the platform, refinery or plant.

A welding habitat was developed within the last few years wherein a temporary building is built around an object to be welded. The habitat, also referred to as an enclosure, is equipped with gas monitors that will automatically signal a shutdown of all welding equipment when a predetermined concentration level of flammable or combustible gas is reached. For example, U.S. Pat. No. 6,783,054 to Pregeant Jr. et al. teaches and claims a system for conducting welding adjacent flammable materials on an offshore platform. The system contains an enclosed chamber having a blower and sensors, each of which monitors a single gas, typically a combustible gas, and the ability to automatically shutdown the welding operation if a predetermined unacceptable concentration of a combustible gas is detected at one or more sensors.

Co-pending application U.S. Ser. No. 10/388,271; filed Mar. 13, 2003, which is incorporated herein by reference, teaches a welding habitat and monitoring system wherein there is wireless communication between gas detection monitors and a CPU monitored by an operator.

While the industry is starting to see habitat and monitoring systems that enable hot work to be preformed in areas here-to-fore not allowed unless at least a portion of the facility was shutdown, there is still a need in the art for improved hot work enclosures and monitoring and control systems that lead to a more economical and safe hot work operation.

SUMMARY OF THE INVENTION

In accordance with the present invention, there is provided an enclosure system comprised of one or more enclosures built about at least one object to be hot worked at a facility wherein flammable or combustible materials are located within a hazardous distance from where the hot work is to be conducted, which enclosure system is comprised of:

a) at least one enclosure, each enclosure comprising: i) enclosing walls, ceiling and floor defining an enclosed chamber in which the hot work is to be conducted; ii) at least one door to allow workers to enter and exit; iii) at least one viewing window; iv) at least one air inlet port; v) at least one air outlet port; vi) a blower in fluid communication with said at least one air inlet port; vii) a blower control in communication with said blower and to a gas detection monitor located at the intake of said blower, wherein the blower control will allow the blower to continue to operate in the event of a shutdown that is not triggered by the gas detection monitor at the intake of the blower; viii) a differential pressure monitor for monitoring the pressure within the enclosure relative to the pressure outside of the enclosure; ix) at least one manual emergency shutdown switch inside of said enclosure; and x) at least one manual emergency shutdown switch outside of, but within the immediate perimeter of, said enclosure;

b) a monitoring system comprised of:
i) a plurality of gas detection monitors located at predetermined locations: a) inside and outside of each enclosure; b) in the vicinity of hot work equipment; and c) in the vicinity of the intake of said blower; each of said gas detection monitors having a means of communicating with a gas detection controller console; and
ii) a gas detection controller console comprised of: a) a means capable of receiving data transmitted from the plurality of gas detection monitors; b) an interface means capable of communicating data from said means of receiving data to the central processing unit (CPU); c) a central processing unit (CPU) containing software capable of, inter alia, accepting, storing, computing, and displaying data received from said plurality of gas detection monitors, d) a display device in communication with said central processing unit and capable of displaying data from said plurality of gas detection monitors; and e) an interface means capable of communicating a signal from the central processing unit to a control system;

c) a control system comprised of:
i) an operator controller console comprised of: a) a source of electrical power for the enclosure system; b) at least one control device; c) a means for displaying the status of each enclosure; d) the capability of communicating predetermined by-pass and system shutdown signals to a shut down controller; and e) an audible alarm that will activate when a shutdown occurs; and ii) a shutdown controller capable of sending shutdown signals to one or more enclosure control devices, and one or more shutdown control devices and to various equipment associated with the hot work to be conducted in said one or more enclosures.

In a preferred embodiment, said at least one enclosure also comprises one or more of the following: a) an audible alarm, b) a visual alarm, c) emergency lights, d) backup batteries, e) a power control and f) a temperature monitoring device.

In another preferred embodiment the hot work is selected from welding, cutting, and grinding.

In another preferred embodiment, the facility is a petroleum drilling platform, a petroleum production platform, a jack-up rig, a pumping station, a tank farm, a petroleum refinery, a chemical plant, an ocean going tanker, or a section of a pipeline.

In yet another preferred embodiment the operator controller console also has the capability to bypass a differential pressure monitor at each of the enclosures.

DETAILED DESCRIPTION OF THE INVENTION

Figure 1:
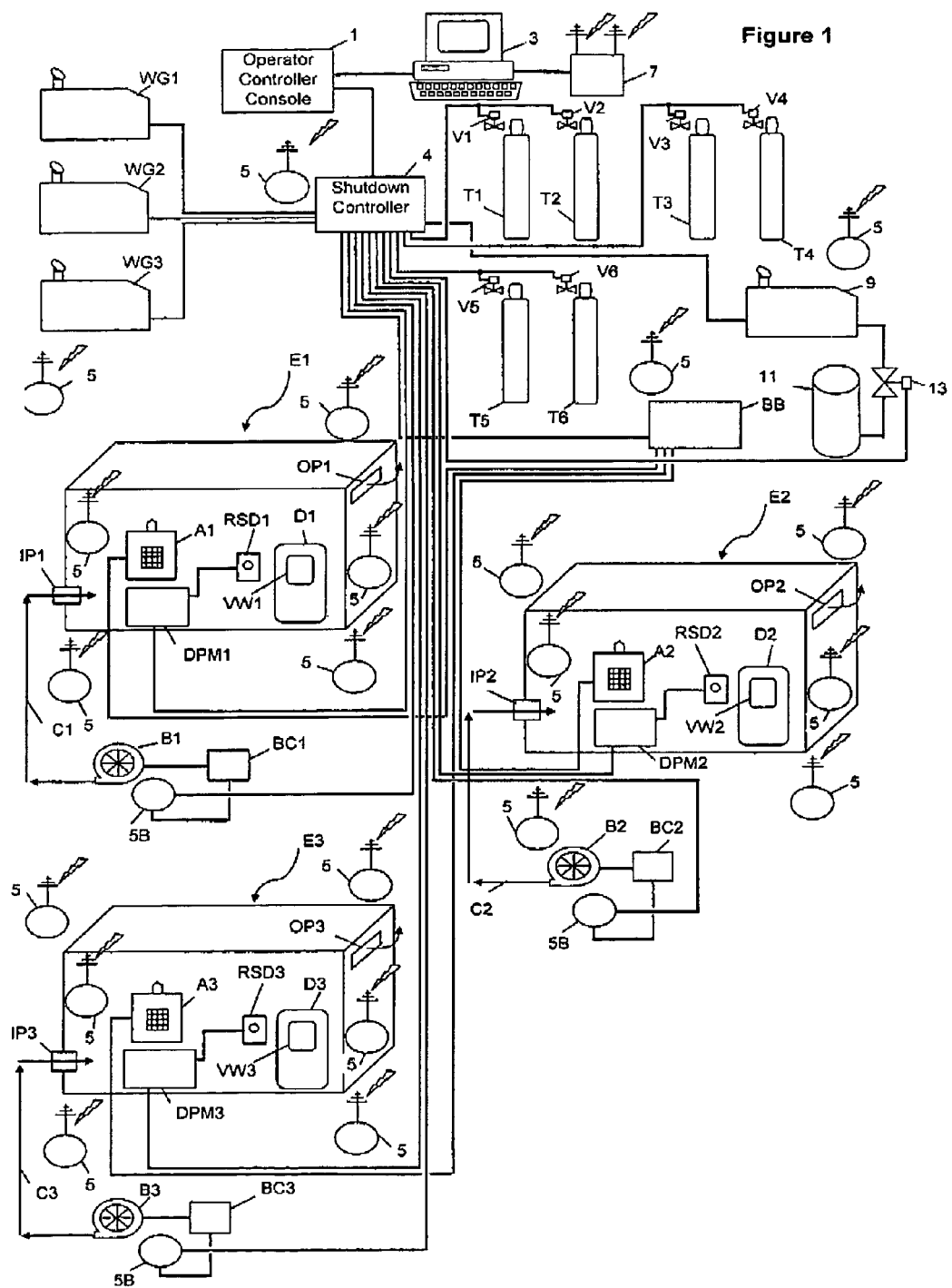
FIG. 1 hereof is a schematic representation of one preferred embodiment of the present invention showing three enclosures, for hot work, that can be simultaneously and independently monitored and controlled.

The present invention can be utilized for any type of hot work and at any type of facility where flammable and/or combustible materials present a safety issue during hot work operations. The term "hot work", as used herein, means any work operation that can result in a fire or explosion in the presence of combustible or flammable materials. Non-limiting examples of the types of hot work that can be conducted in the enclosures of the present invention include all types of welding, such as gas welding, electric arc welding and cutting, including gas tungsten arch welding (GTAW), gas shielding metal arch welding (GMAW), friction welding, laser welding; cutting such as with a torch or plasma cutter and cutting, brazing, soldering, and grinding with electric and pneumatic tools. Also included is working in electric panels while they are still energized at a location of said facility considered to be classified, in reference to the presence of flammable or combustible materials, by facility area classification drawings.

The present invention can be practiced at any type of facility where hot work is to be done in the vicinity of flammable or combustible material. Non-limiting examples of facilities where the instant invention can be practiced include petroleum drilling and production platforms, including jack-up rigs; pumping stations; petroleum refineries; chemical plants; tank farms where flammable or combustible materials are stored; and tankers and pipelines used for transporting flammable or combustible materials. As previously mentioned, governmental regulations are strict with respect to performing hot work at such facilities. In the past, at least a portion of such a facility would have to be shutdown prior to performing any hot work operation.

Practice of the present invention allows for safe and efficient hot work to be performed in the vicinity of flammable and combustible materials. At least one enclosure, also sometimes referred to herein as a habitat, is built about the object or objects to be hot worked. The enclosure is of temporary construction comprised of enclosing walls, ceiling extending between the walls and floor extending between the walls, thereby defining an enclosed chamber. It can take any shape depending on the object or objects to be hot worked and the particular site limitations at which it is to be built. Any material suitable for constructing such an enclosure can be used. Non-limiting examples of suitable construction materials include metals, ceramics, wood, and composite materials such as fiberglass and carbon fiber reinforced polymeric materials. Fire retardant wood is preferred, more preferably plywood, for the combination of safety, cost, and convenience purposes. Scaffolding, if needed, will be provided to support at least a portion of each enclosure, particularly if the enclosure needs to be positioned lateral to a production or drilling platform. The enclosure will be large enough to allow a predetermined number of workers to comfortably work inside the enclosure with all necessary tools, hot work equipment and monitoring and safety devices. At least two workers will typically be in a single enclosure. If only two workers are provided, one worker will be one performing the hot work operation and the other worker will typically be on fire watch for observing the hot work. Workers inside of the enclosure will have the capability of verbally communicating with the operator and other workers outside of the enclosure by use of conventional means, preferably by two-way wireless radio.

Each enclosure will contain at least one door that preferably opens to the outside of the enclosure. The door will be one that can be easily opened from both the inside and outside of the enclosure and built in a break-away fashion in case of an emergency. At least one shatterproof viewing window will be present on either the door or on one or more walls for observing activity within the enclosure. Shatterproof windows are well known in the art and are typically manufactured as laminated glass with an inner layer of transparent plastic material. All plastic viewing windows can also be used for the instant enclosures. The floor of each enclosure will preferably be lined with a suitable material capable of withstanding temperatures up to about, 3000° F., preferably up to about 3,500° F. Such a floor will preferably be comprised of a bottom layer of fire resistant plywood covered with a refractory cloth material. The cloth material, which will typically be supplied in rolls of ⅛ inch to ¼ inch thickness is of the type marketed by Thermostatic Industries Inc. of Huntington, Calif. under the tradename Panther Felt. Such a material is comprised of a refractory fiber, such as fiberglass or a ceramic fiber such as aluminosilicate or aluminoborosilicate. On top of the cloth layer will preferably be a relatively thin malleable layer sheet metal material, preferably a stainless steel, to safely contain slag or sparks generated from the hot work operation. The floor will also preferably contain side plates (not shown) around the periphery of the floor to help contain sparks and slag. The side plates will typically be several inches to about a foot off the floor.

Each enclosure will also contain at least one inlet port to allow a suitable amount of air to be conducted into the enclosure by use of a blower, preferably an electrically operated blower. At least one air outlet port will also be provided. It is preferred that each air outlet port contain a spark resistant grill or filter to substantially reduce the potential of sparks being carried from inside the enclosure to outside where flammable or combustible materials may be present. Another preferred way of minimizing the risk of sparks and slag from exiting the enclosure at a high temperature is to provide a metal ventilation duct system (not shown) of sufficient length leading to the spark resistant grill so that any sparks or slag entering the ventilation system in the enclosure will cool to a safe temperature by the time they exit the grill into the atmosphere.

Each enclosure, while in use, will be under a positive pressure to provide fresh air to workers inside the enclosure and to prevent gases from outside the enclosure from entering the enclosure. The pressure of each enclosure is monitored by a suitable differential pressure monitor (DPM). The present invention provides for the monitoring and control of multiple enclosures by a single operator using a single wireless gas detection monitoring system and a single control system wherein multiple enclosures can be individually or all can be simultaneously shutdown, or certain equipment can be selectively by-passed if one or more predetermined events occur.

It will be understood that each enclosure will also have a conventional explosion proof lighting system (not shown) supported by a backup battery system (BB) so that lighting inside each enclosure will continue to function during an emergency shutdown. A conduit sealing system will also be used to seal any spaces around cables, hoses and pipes entering an enclosure from the outside.

The present invention will be better understood with reference to the figures hereof. FIG. 1 is a simplified schematic of one preferred embodiment of the present invention showing three enclosure systems wherein welding is the hot work to be performed. All three enclosures are managed by a single operator using a single monitoring system, preferably a single wireless gas detection monitoring system, and a single control system. FIG. 1 shows three enclosures, E1, E2, and E3, each having at least one door D1, D2, and D3, at least one air intake port IP1, IP2, and IP3, and at least one air outlet port OP1, OP2, and OP3. It is preferred that the door open outward and that it be a break-away door. That is a door contructed in such a way that in the event of an emergency a single worker could exert enough force so that the door breaks away from its support means and provides the worker with a means of escape. At least one shatterproof viewing window VW1, VW2, and VW3 will also be provided for each enclosure for observing workers inside the enclosure. The three enclosures are also in communication with appropriate hot work equipment, such as welding machines and generators WG1, WG2, and WG3 and associated gas tanks T1–T6. The gas tanks will typically contain welding gases such as oxygen and acetylene. Each tank is equipped with, respectively, a shutdown valve V1 to V6, which is activated in case of an emergency shutdown by receiving a shutdown signal from shutdown controller 4. Valves V1 to V6 will preferably be conventional solenoid valves readily available in the art. Further, each enclosure is provided with at least one remote manual emergency shutdown switch RSD1, RSD2, and RSD3. There is also a manual shutdown switch integrated in at least one of the enclosure controls (not shown) and also for the operator monitoring the operator controller console. It is preferred that the emergency shutdown switches be hard wired and not wireless.

It is within the scope of this invention that pneumatic tools be used in one or more of the enclosures. Such tools will require an air compressor 9 and associated equipment for running the pneumatic tools, such as volume tank 11 and blow-down valve 13. Blow-down valve 13 provides for the sudden bleeding of compressed air from the compressed air system in case of an emergency to prevent damage to such things as compressor seals. It also serves to immediately stop the operation of pneumatic tools in case of an emergency shutdown. The system of the present invention will also be provided with at least one back-up battery BB in case of a power failure at the facility at which hot work is being performed.

There is also a blower, B1, B2, and B3 associated with the inlet ports of each enclosure for providing fresh air to the workers inside the enclosure, as well as for providing a positive pressure differential inside the enclosure. Although the blowers could be operated electrically or by use of compressed air, it is preferred that the blowers be electric blowers. Air is provided from the blowers to the inlet ports via any suitable hose or ducting C1, C2, and C3. It will be understood that the temperature inside of each enclosure can be controlled to some degree by providing either cool air or heated air to the blower intake. Cooled or heated air can be provided by any suitable conventional means, such as by use of a conventional heat exchange unit at the intake of the blower. It is preferred that each blower have associated therewith its own independent control device BC1, BC2, and BC3 in communication with said shutdown controller, but which can be by-passed by the operator at the operator controller console. That is, if the emergency shutdown is not triggered by the gas detection monitors 5B1, 5B2, and 5B3 located at the intake of the blowers then the blowers can be made to continue to operate for the safety of the workers inside the enclosure.

Each enclosure will also preferably have it's own independently operated audible alarm and light assembly A1, A2, and A3. The audible alarm can be a horn used to warn personnel inside the enclosure in the event of a system shutdown for that enclosure. The light is preferably a strobe light that is also used to warn personnel in the enclosure in the event of an emergency shutdown.

Each enclosure contains a differential pressure monitor DPM1, DPM2, and DPM3 that monitors the difference in pressure within the enclosures compared to the pressure outside the enclosures. One type of differential pressure monitor that can be used in the practice of the present invention is the Explosion Proof Differential Pressure Switch, such as Model 1950, supplied by Dwyer Instruments, Inc., of Michigan City, Ind. The interior of the enclosure is at a higher pressure than the pressure outside of the enclosure to prevent flammable or combustible gases from entering the enclosure from the outside during hot work operation. If the pressure inside the enclosure drops to substantially the pressure outside of the enclosure a signal is sent to the shutdown controller which sends the appropriate shutdown signal to all welding equipment, including tank valves, welding machines, etc. There will be times when workers will need to enter or exit the enclosure during normal and safe working conditions and unless the DPMs can be by-passed an emergency shutdown will result if the pressure in the enclosure drops to a level that will be substantially equal to the pressure outside the enclosure. Thus, a worker wishing to enter or exit an enclosure would communicate with the operator, who would deactivate the DPM for that enclosure until the worker has safely entered or exited the enclosure, upon which it is reactivated.

The three enclosures E1, E2, and E3 can all simultaneously and independently be monitored and controlled by an operator monitoring the operator controller console 1, which is the central control center for all three enclosures. It will be understood that three enclosures are shown in the Figures hereof for illustrative purposes only. The present invention can be practiced for only one enclosure or for any number of enclosures, and all will be independently and simultaneously monitored and controlled. Of course, practical considerations, such as construction time, number of workers required, and space limitations will dictate the maximum number of enclosures that can be built and simultaneously operated at any given facility. The operator controller console 1 will contain a suitable power supply (not shown), at least one control device, a means for monitoring the status of any one or more enclosure, a manual emergency shutdown switch that is capable of shutting down any one or more of the enclosures simultaneously, a threshold indicator indicating if the upper and or lower threshold has been reached for any given gas detection variable, an appropriate audible and visual alarm system, and a differential pressure monitor (DPM) by-pass switch for each of the enclosures. The power supply will preferably be a conventional AC to DC power converter. Non-limiting examples of control devices include electrical relays, solenoids, switches, fuses and circuit breakers.

The operator controller console 1 is integrally connected to a monitoring system. The monitoring system can be any suitable system that will allow communication between the components of the system, preferably the gas detection controller console and the portable gas detection monitors. The monitoring system is comprised of a gas detection controller console 3, which preferably contains a suitable radio modem transceiver, a central processing unit (CPU), a display device and a plurality of interface cards. Interface cards are well known in the art and are typically a circuit board with the appropriate components to allow communication across boundaries, such as between hardware, or between software and hardware. Interface cards also allow communication between different software languages and codes that an application needs to communicate with each other and with hardware. It is to be understood that the entire gas detection monitoring system could be hardwired, although a wireless system is preferred. The display device is preferably part of a portable computer, more preferably a laptop computer. The gas detection controller console 3 will be in communication with a plurality of gas detection monitors 5, which will be strategically placed within and about the enclosures as well as in the vicinity of hot work equipment, blowers and any other of the various equipment associated with the present enclosure system. It is preferred that at least two gas detection monitors be located inside at least one, more preferably inside of all enclosures. It is also within the scope of the present invention to place gas monitors a distance away, preferably at least 10 feet away from the enclosure, in such a pattern that substantially 100% of the perimeter of the enclosure is monitored by gas detection monitors. A remote antenna box 7 is typically used for receiving signals (radio frequency) from the plurality of gas detection monitors and carrying them to the gas detection controller console 3, in the event that it is being used in the interior of a building. It is within the scope of the present invention that the software for the gas detection system be suitable for labeling the plurality of gas detection monitors as to their physical location and being viewable via the display device. This will allow the operator to know immediately what monitor is sending a distress signal which will allow the operator to take immediate appropriate measures at the precise location of distress. For example, if the distress signal is not coming from a gas detection monitor located in the vicinity of the blower intake, the operator can over ride the blower shutdown function so that the blower continues to conduct fresh air into the enclosure.

As previously mentioned, each gas detection monitor is in communication with the gas detection controller console 3. The gas detection monitors are preferably portable and wireless making them capable of being carried or worn by workers. Each monitor will be programmed to measure one or more non-limiting variables, such as temperature, combustible gases including those represented in the lower explosive limit (LEL), oxygen, carbon monoxide, and hydrogen sulfide. Although single point gas detection monitors can be employed, it is preferred that multi-point monitors be used. That is, a single point monitor is capable of monitoring the concentration level of only one gas, whereas a multi-point monitor is capable of simultaneously monitoring the concentration of more than one gas and as a part of a wireless system, simultaneously communicating information to the transceiver of the gas detection controller console 3, which in turn transmits the signal through a suitable interface means, preferably an interface card, that will translate the data into a protocol suitable for software in an associated CPU to read, analyze, display, store, and respond thereto. It is preferred that one or more of the gas detection monitors also have the capability of two-way voice communication with the operator of the controller console. The gas detection controller console 3 interfaces with the operator controller console 1 by any suitable means, such as also by use of a suitable interface card. The operator controller console will have the capabilities as previously mentioned, such as showing the status of each enclosure etc. The CPU of the gas detection controller console will also be capable of sending shutdown instructions to the operator controller console 1, which in turn sends the signal to the shutdown controller box 4, which signals the targeted equipment to shutdown. The ability of an operator to be able to monitor, on a display device, the predetermined variables, such as gas levels, etc. allows the operator to take the proper preemptive action prior to the level of emergency being reached. As previously mentioned, the operator controller console will display the status of each enclosure, preferably by the use of lights. That is, one light display can represent a safe situation and a different light display for an unsafe, or emergency shutdown situation.

An upper concentration level for each gas is programmed into the CPU software and if this level is reached, the system will automatically shutdown all targeted hot work equipment at all enclosures via communication with a shutdown controller 4. The shutdown controller 4 is in communication with all systems, devices and equipment of the overall system. For example, upon receiving an emergency shutdown signal from the operator controller console 1 via the gas detection controller console 3, a shutdown signal is sent to valves V1–V6 shutting down all gas delivery to the welding equipment. A shutdown signal is also sent to the blower control boxes BC1, BC2, and BC3 as well as to blowdown valve 13 and welding equipment WG1, WG2, and WG3. As previously mentioned, it is within the scope of this invention that blowers B1, B2, and B3 can continue to be operated, if it is determined that the emergency was not caused by the presence of combustible or flammable gas at the intake of the blowers. It is also within the scope of this invention that a function be provided that will shutdown all enclosures in the case of a facility shutdown. That is, if a production platform, refinery or other facility has a general emergency shutdown, all hot work will automatically be shutdown as part of the facility shutdown. Solid lines (without arrow heads) between components of the system represent electrical hardwiring EW between components of the system in both FIG. 1 and in FIG. 2. All hardwiring is not labeled since it will be evident from the Figures where hardwiring occurs.

Figure 2:
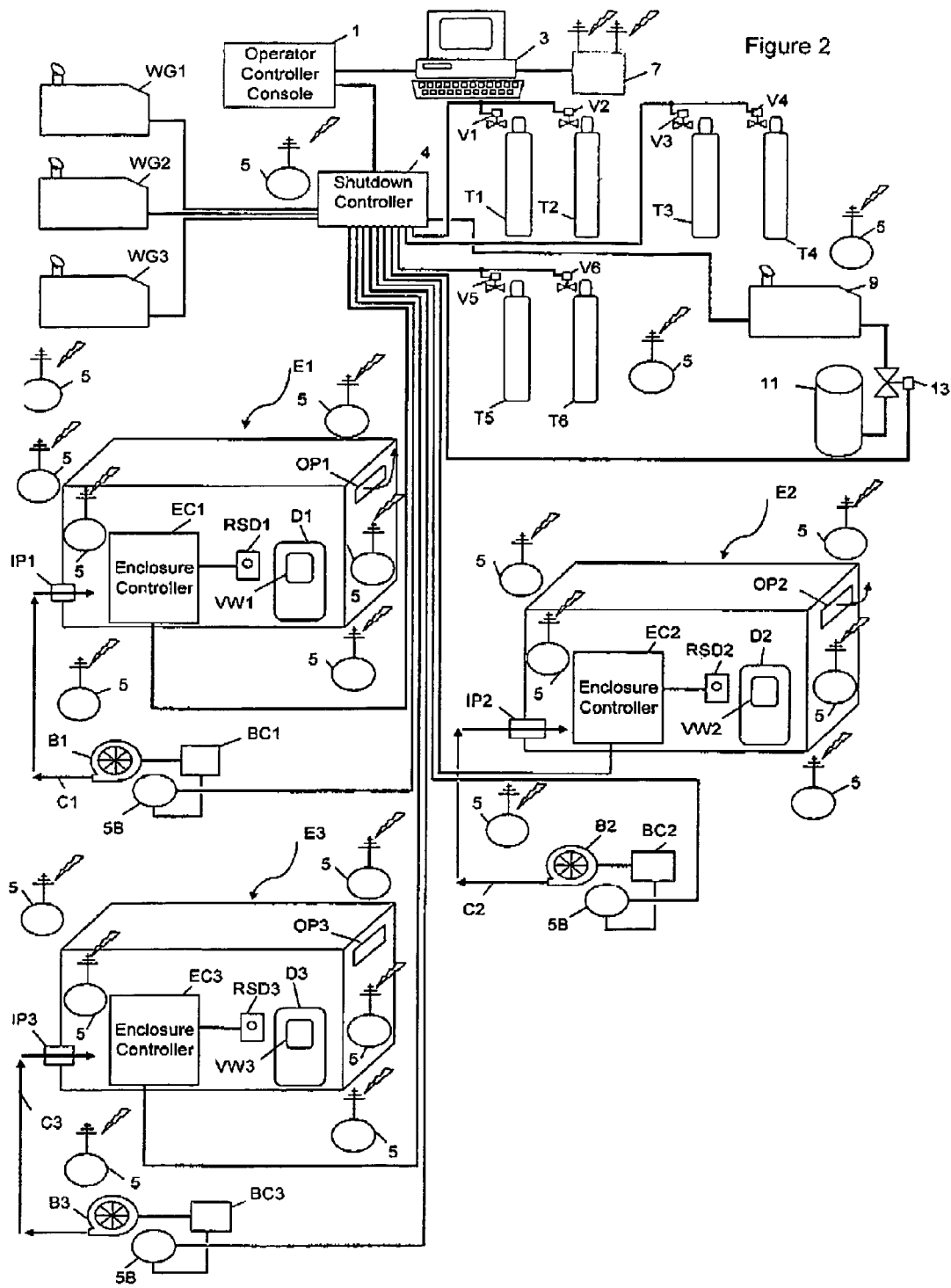
FIG. 2 hereof is a schematic representation of another preferred embodiment of the present invention also showing three enclosures that can be simultaneously and independently monitored and controlled. This schematic shows an audible/visual alarm, DPM, and backup battery system as an integral unit for each enclosure.

FIG. 2 hereof represents another preferred embodiment of the present invention where the audible and visual alarm warning system is combined with the differential pressure monitor and backup batteries into a single unit, referred to herein as the enclosure controllers EC1, EC2, and EC3. All of FIG. 2 components that are common to FIG. 1 have the same numbers as those of FIG. 1 hereof.

What is claimed is:

1. An enclosure system comprised of one or more enclosures built about at least one object to be hot worked at a facility wherein flammable or combustible materials are located within a hazardous distance from where the hot work is to be conducted, which enclosure system is comprised of:
    a) at least one enclosure, each enclosure comprising: i) enclosing walls, ceiling and floor defining a chamber in which the hot work is to be conducted; ii) at least one door to allow workers to enter and exit; iii) at least one air inlet port; iv) at least one air outlet port; v) a blower having an intake and an exhaust, which exhaust is in fluid communication with said at least one air inlet port; vi) a blower control in communication with said blower and to a gas detection monitor located at the intake of said blower and to a shutdown controller, wherein the blower control has the capability of allowing the blower to continue to operate during an emergency shutdown that is not triggered by combustible or flammable gas detected at the gas detection monitor at the intake of the blower; vii) a differential pressure monitor for monitoring the pressure within the enclosure relative to the pressure outside of the enclosure; viii) at least one manual emergency shutdown switch inside of said enclosure; and ix) at least one manual emergency shutdown switch outside of, but within the perimeter of, said enclosure;
    b) a monitoring system comprised of:
    i) a plurality of gas detection monitors located at predetermined locations inside and outside of each enclosure; wherein each of said gas detection monitors having a means of communicating with a gas detection controller console; and
    ii) a gas detection controller console comprised of: a) a means capable of receiving data transmitted from the plurality of gas detection monitors; b) an interface means capable of communicating data from said means to a central processing unit; c) the central processing unit containing software capable of accepting, storing, computing, and displaying data received from said plurality of gas detection monitors, d) a display device in communication with said central processing unit and capable of displaying data from said plurality of gas detection monitors; and c) an interface means capable of communicating a signal from the central processing unit to a control system;
    c) the control system comprised of:
    i) an operator controller console comprised of; a) a source of electrical power for the enclosure system; b) at least one control device; c) a means for displaying the status of each enclosure; d) the capability of communicating predetermined by-pass and system shutdown signals to a shut down controller; e) a by-pass function that has the capability of overriding a shutdown signal triggered by the differential pressure monitor in any one or more of said enclosures to allow workers to enter and exit said one or more enclosures without triggering a shutdown; and f) an audible alarm that will activate when a shutdown occurs; and
    ii) the shutdown controller capable of sending shutdown signals to one or more enclosure control devices, and one or more shutdown control devices and to various equipment associated with the hot work to be conducted in said one or more enclosures.

2. The enclosure system of claim 1 wherein the walls, floor, door and ceiling of the enclosure are composed of fire retardant wood.

3. The enclosure system of claim 2 wherein the floor of said enclosure is further covered with a layer of fire proof refractory cloth material on top of which is a layer of sheet metal.

4. The enclosure system of claim 1 wherein the door of each enclosure opens outward.

5. The enclosure system of claim 1 wherein each enclosure is provided with an explosion proof interior lighting system.

6. The enclosure system of claim 1 wherein the outlet port of at least one enclosure is provided with a spark resistant filter.

7. The enclosure system of claim 1 wherein the hot work to be performed is welding.

8. The enclosure system of claim 1 wherein the blower of each enclosure is an electrically operated blower.

9. The enclosure system of claim 1 wherein at least two gas detection monitors is located in each enclosure.

10. The enclosure system of claim 1 wherein the various equipment associated with the hot work is selected from a) welding machines, b) generators, c) air compressors, and d) tanks for holding gases for a hot work operation.

11. The enclosure system of claim 1 wherein the source of electrical power is an AC to DC power converter.

12. The enclosure system of claim 1 which is located at a facility selected from a drilling platform a production platform, a jack-up rig, a pumping station, a petroleum refinery, a chemical plant, a tank farm, an ocean going tanker, and a section of pipeline.

13. The enclosure system of claim 1 wherein there are at least two enclosures.

14. The enclosure system of claim 1 wherein the operator controller console contains a bypass function that can override a shutdown signal to one or more blowers.

15. The enclosure system of claim 1 wherein each enclosure is provided with at least one additional item selected from the group consisting of: a) an audible alarm, b) a visual alarm, c) emergency lights, d) backup batteries and e) a power control, and f) a temperature monitoring device.

16. The enclosure system of claim 1 wherein each enclosure is also provided with an integral unit containing an audible alarm, a visual alarm, a differential pressure monitor, and backup batteries.

17. The apparatus of claim 1 wherein the enclosure has a viewing window.

18. An enclosure system comprised of one or more enclosures built about at least one object to be hot worked at a facility wherein flammable or combustible materials arc located within a hazardous distance from where the hot work is to be conducted, which facility is selected from a drilling platform, a production platform, a jack-up rig, a pumping station, a petroleum refinery, a chemical plant a tank farm, an ocean going tanker, and a section of pipeline, which enclosure system is comprised of:
  a) at least one enclosure, each enclosure comprising: i) enclosing wails, ceiling and floor defining a chamber in which the hot work is to be conducted; ii) at least one door that opens outward to allow workers to enter and exit; iii) at least one shatterproof viewing window; iv) at least one air inlet port; v) at least one air outlet port containing a spark resistant filter; vi) an electrically operated blower located outside of said at least one enclosure and having an intake and an exhaust which exhaust is in fluid communication with said at least one air inlet port vii) a blower control in communication with said blower and to a shutdown controller, and to a gas detection monitor located at the intake of said blower, wherein the blower control has the capability of allowing the blower to continue to operate during an emergency shutdown that is not triggered by combustible or flammable gas detected at the gas detection monitor at the intake of the blower; viii) a differential pressure monitor for monitoring the pressure within the enclosure relative to the pressure outside of the enclosure; ix) at least one manual emergency shutdown switch inside of said enclosure; and x) at least one manual emergency shutdown switch outside of said enclosure, but within the perimeter of, said enclosure;
  b) a wireless monitoring system comprised of:
  i) a plurality of wireless gas detection monitors located at predetermined locations: a) at least 10 feet away and encompassing the outside of each enclosure; b) at least two wireless gas detection monitors inside of each enclosure; c) in the vicinity; of hot work equipment and d) at the intake of said blower; each of said gas detection monitors being in wireless communication with a gas detection controller console; and
  ii) a gas detection controller console comprised of: a) a transceiver capable of receiving wireless data transmitted from said plurality of gas detection monitors; b) an interface card capable of communicating data from said transceiver to a central processing unit; c) a central processing unit containing; software capable of accepting, storing, computing, and displaying data received from said plurality of gas detection monitors, d) a display device in communication with said central processing unit and capable of displaying data from said plurality of gas detection monitors; and e) an interface card capable of communicating a signal from the central processing unit to a control system;
  c) a control system comprised of:
  i) an operator controller console comprised of; a) a source of electrical power for the enclosure system; b) at least one control device; c) a means for displaying the status of each enclosure; d) the capability of communicating predetermined by-pass and system shutdown signals to a shut-down controller; e) a by-pass function that has the capability of overriding a shutdown signal triggered by the differential pressure monitor in any one or more of said enclosures to allow workers to enter and exit said one or more enclosures without triggering a shutdown; and f) an audible alarm that will activate when a shutdown occurs; and
  ii) the shutdown controller capable of sending shutdown signals to one or more enclosure control devices, and one or more shutdown control devices and to various equipment associated with the hot work to be conducted in said one or more enclosures.

19. The enclosure system of claim 18 wherein the walls, floor, door and ceiling of the enclosure are composed of fire retardant wood.

20. The enclosure system of claim 19 wherein the floor is constructed of a bottom layer of fire retardant plywood on top of which is a refractory cloth material on top of which is a surface layer of sheet metal.

21. The enclosure system of claim 18 wherein each enclosure is provided with an explosion proof interior lighting system.

22. The enclosure system of claim 18 wherein the hot work to be performed is welding.

23. The enclosure system of claim 18 wherein the various equipment associated with the hot work is selected from a) welding machines, b) generators, c) air compressors, and d) tanks for holding gases for a hot work operation.

24. The enclosure system of claim 18 wherein the source of electrical power is an AC to DC power converter.

25. The enclosure system of claim 18 which is located at a facility selected from a drilling platform, a production platform, a jack-up rig, a pumping station, a petroleum refinery, a chemical plant, a tank farm, an ocean going tanker, and a section of pipeline.

26. The enclosure system of claim 18 wherein there are at least two enclosures.

27. The enclosure system of claim 18 wherein each enclosure is provided with at least one additional item selected from the group consisting of: a) an audible alarm, b) a visual alarm, c) emergency lights, d) backup batteries and e) a power control box, and f) a temperature monitoring device.

28. The enclosure system of claim 18 wherein each enclosure is also provided with an integral unit containing an audible alarm, a visual alarm, a differential pressure monitor, and backup batteries.

29. A method for isolating the area about an item to be hot worked at a facility containing combustible or flammable material, which method comprises:
  a) building an enclosure big enough about the item to be hot worked so that at least two workers can occupy it and conduct a hot work operation, which enclosure comprising: i) enclosing walls, ceiling and floor defining an enclosed chamber in which the hot work is to be conducted; ii) at least one door to allow workers to enter and exit; iii) at least one viewing window; iv) at least one air inlet port; v) at least one air outlet port; vi) a blower having an intake and an exhaust which exhaust is in fluid communication with said at least one air inlet port; vii) a blower control in communication with said blower and to a shutdown controller and to a gas detection monitor located at the intake of said blower, wherein the blower control has the capability of allowing the blower to continue to operate during an emergency shutdown that is not triggered by combustible or flammable gas detected at the gas detection monitor at the intake of the blower; viii) a differential pressure monitor for monitoring the pressure within the enclosure relative to the pressure outside of the enclosure; ix) at least one manual emergency shutdown switch inside of said enclosure; and x) at least one manual emergency shutdown switch outside of said enclosure, but within the immediate perimeter of, said enclosure;
  b) providing the enclosure with a monitoring system comprised of:

i) a plurality of gas detection monitors located at predetermined locations: a) inside and outside of each enclosure; b) in the vicinity of hot work equipment; and c) in the vicinity of the intake of said blower; each of said gas detection monitors having a transceiver in wireless communication with a gas detection controller console; and ii) a gas detection controller console comprised of: a) a transceiver capable of receiving wireless data transmitted from the plurality of gas detection monitors; b) an interface card capable of communicating data from said transceiver to a central processing unit c) the central processing unit containing software capable of accepting, storing, computing, and displaying data received from said plurality of gas detection monitors, d) a display device in communication with said central processing unit and capable of displaying data from said plurality of gas detection monitors; and e) an interface card capable of communicating a signal from the central processing unit to a control system;

c) further providing said enclosure with a control system comprised of:

i) an operator controller console comprised of; a) an electrical power source for the enclosure system; b) at least one control device; c) a means for displaying the status of each enclosure; d) the capability of communicating predetermined by-pass and system shutdown signals to a shut down controller; e) a bypass function that has the capability of overriding a shutdown signal triggered by the differential pressure monitor in any one or more of said enclosures to allow workers to enter and exit said one or more enclosures without triggering a shutdown; and f) an audible alarm that will activate when a shutdown occurs; and ii) the shutdown controller capable of sending shutdown signals to one or more enclosure control devices, and one or more shutdown control devices, and to various equipment associated with the hot work to be conducted in said one or more enclosures.

30. The method of claim 29, wherein the walls, floor, door and ceiling of the enclosure are composed of fire retardant wood.

31. The method of claim 30 wherein the floor of said enclosure is further covered with a layer fire proof refractory cloth material on top of which is a layer of sheet metal.

32. The method of claim 29 wherein the door of each enclosure opens outward.

33. The method of claim 29 wherein each enclosure is provided with an explosion proof interior lighting system.

34. The method of claim 29 wherein the outlet port of at least one enclosure is provided with a spark resistant filter.

35. The method of claim 29 wherein the hot work to be performed is welding.

36. The method of claim 29 wherein the blower of each enclosure is an electrically operated blower.

37. The method of claim 29 wherein at least two gas detection monitors is located in each enclosure.

38. The method of claim 29 wherein the various equipment associated with the hot work is selected from a) welding machines, b) generators, c) air compressors, and d) tanks for holding gases for a hot work operation.

39. The method of claim 29 wherein the source of electrical power is an AC to DC power converter.

40. The method of claim 29 which is located at a facility selected from a drilling platform, a production platform, a jack-up rig, a pumping station, a petroleum refinery, a chemical plant, a tank farm, an ocean going tanker, and a section of pipeline.

41. The method of claim 29 wherein there are at least two enclosures.

42. The method of claim 29 wherein the operator controller console contains a bypass function that can override a shutdown signal to one or more blowers.

43. The method of claim 29 wherein each enclosure is provided with at least one additional item selected from the group consisting of: a) an audible alarm, b) a visual alarm, c) emergency lights, d) backup batteries and e) a power control, and f) a temperature monitoring device.

44. The method of claim 29 wherein each enclosure is also provided with an integral unit containing an audible alarm, a visual alarm, a differential pressure monitor, and backup batteries.

* * * * *